Figure 1:
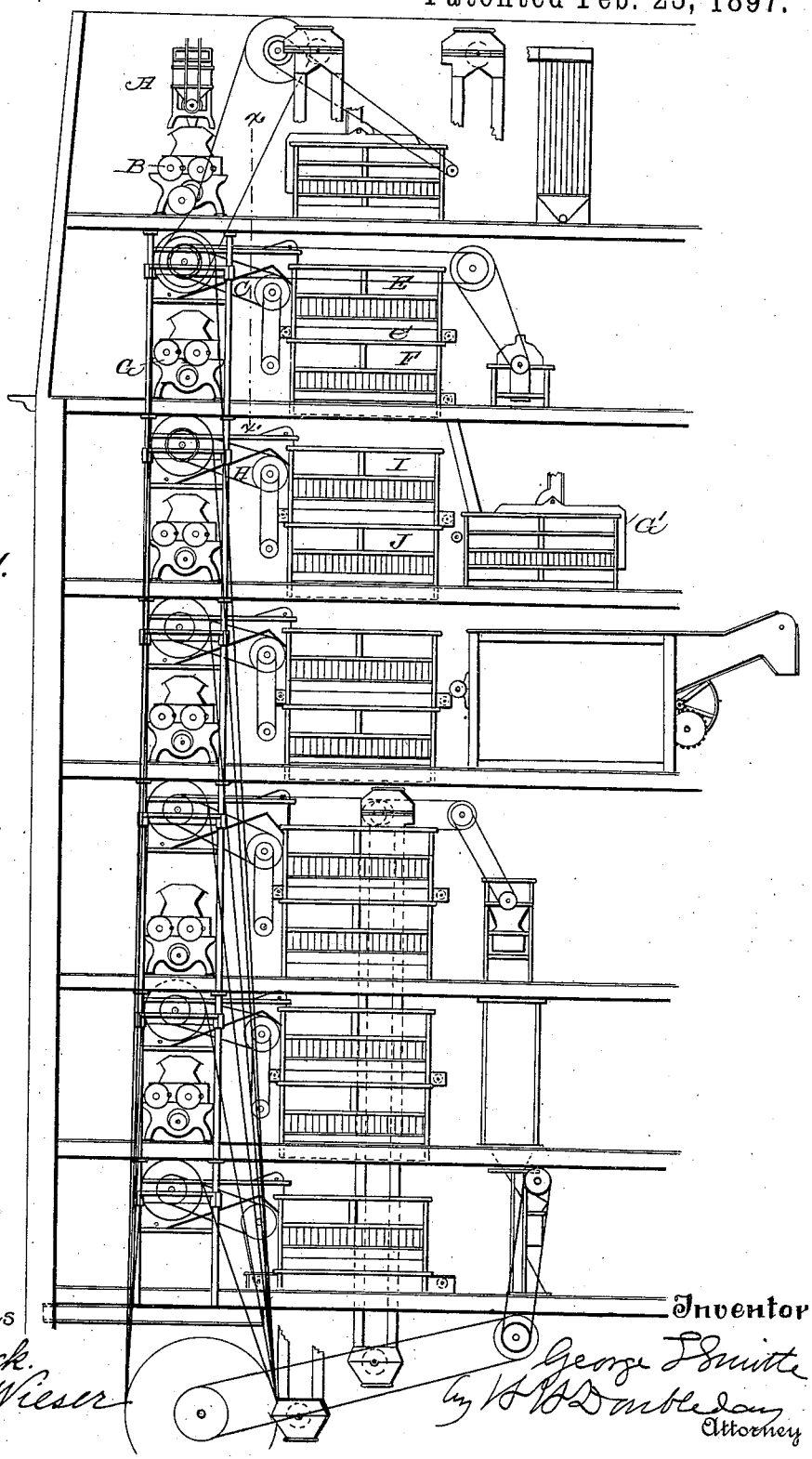

(No Model.) 5 Sheets—Sheet 3.

G. T. SMITH.
PROCESS OF MILLING.

No. 577,456. Patented Feb. 23, 1897.

WITNESSES
Jos. C. Stack.
Louis Wieser

INVENTOR
George T. Smith
By H. H. Doubleday
Attorney

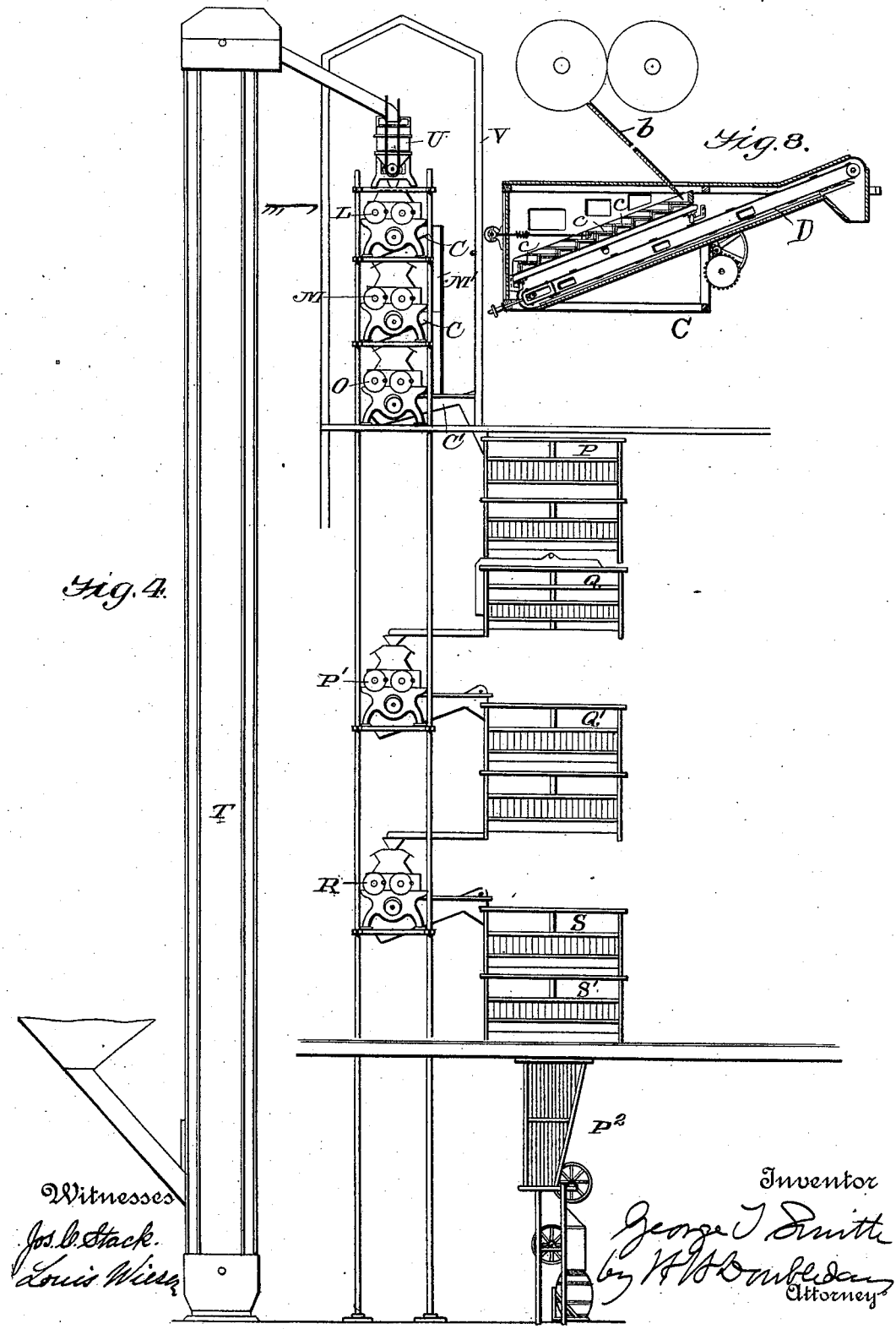

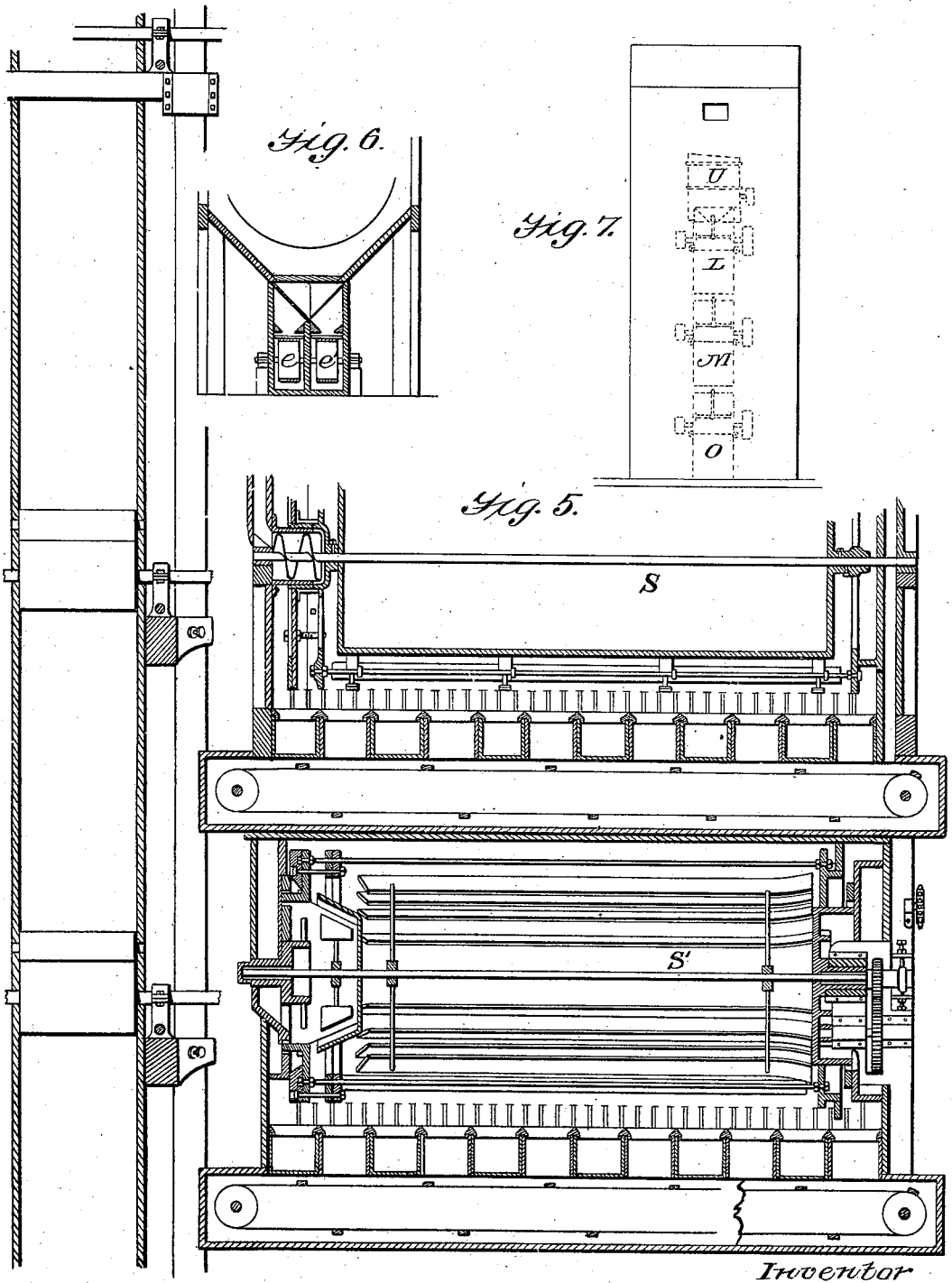

UNITED STATES PATENT OFFICE.

GEORGE T. SMITH, OF CHICAGO, ILLINOIS, ASSIGNOR TO THE GEORGE T. SMITH MILL BUILDING COMPANY, OF CLEVELAND, OHIO.

PROCESS OF MILLING.

SPECIFICATION forming part of Letters Patent No. 577,456, dated February 23, 1897.

Application filed April 10, 1895. Serial No. 545,264. (No model.)

*To all whom it may concern:*

Be it known that I, GEORGE T. SMITH, a citizen of the United States, residing at Chicago, in the county of Cook and State of Illinois, have invented certain new and useful Improvements in the Process of Milling, of which the following is a specification, reference being had therein to the accompanying drawings.

My invention relates to a new process of manufacturing flour or meal from wheat or other grains, and has for its object the preservation in the finished product of the constituent elements of the grain which, when the flour or meal is cooked, impart to it its highest flavor.

It is well known that in the ordinary process of milling by the use of either rollers or millstones the grain as it is going through the several reductions is heated quite hot and between each reduction is cooled as the meal, chop, middlings, or other product is passing through the various graders, purifiers, and reels or other separators which are used for such purposes, whether they effect the division of the material into different grades by sifting or by subjecting it to air-currents. In fact in some mills means are employed to produce air-currents through the casings and spoutings to insure the rapid cooling of the material as it is passing through the various reductions and separations.

I have found as the result of carefully-conducted experiments that during these repeated alternations of heating and cooling there takes place a quite large evaporation of moisture which is continued in the grain in its normal condition; that and with such loss of water from the berry or kernel there is also a serious waste of the above-referred-to constituent element or elements which impart the desirable flavor to the cooked product when the manufacture of flour or meal has been carried on or conducted in accordance with my invention, one part of which consists, essentially, in keeping the entire mass of material which is subjected to the various reductions warm throughout the period of time during which it is subjected to the various manipulations required for the purpose.

The object of this part of my invention is to insure that the bran shall be toughened by the action of heat, which is either applied to it before it is delivered to the break-rolls or is generated by the action of the rolls themselves upon the grain while reducing it, and at the same time prevent the curling of the bran which occurs when the chop or meal is permitted to cool between the successive reductions, and also to prevent the escape from the grain of its normal moisture through evaporation which is incident to the ordinary methods of milling, whereby I am enabled to retain in the finished product important elements which would otherwise be lost. This result I have succeeded in accomplishing by keeping the chop, meal, or middlings in relatively large masses or quantities, thereby exposing but a relatively small surface of the mass to contact with the atmosphere, whereby its loss of temperature and its loss by evaporation are reduced to a minimum, and to facilitate making the various reductions with the least possible reduction in temperature and loss by evaporation I have invented a new construction of mill whereby I have greatly reduced the time required for the travel of material from one reducing machine or apparatus to the next reducer, to the action of which the material is to be subjected, and also provide that the material shall be collected and retained in a quite deep or thick mass or bulk while being conveyed or moved through and about the various machines employed in making the reductions and separations.

Having thus set forth the object and nature of my invention, I will now proceed to describe my apparatus and one mode which I have adopted for carrying it into effect.

Figure 2:
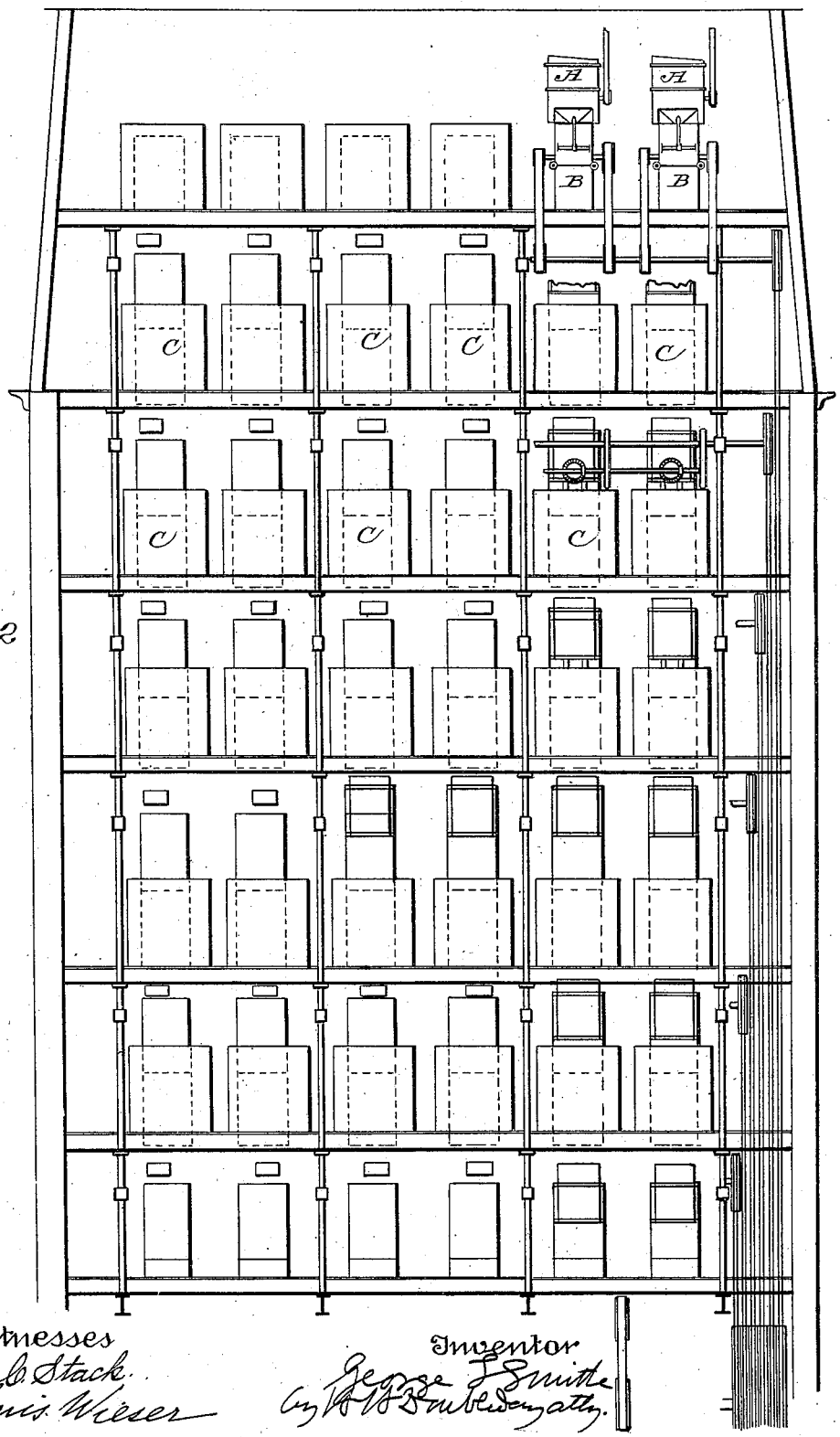
Figure 3:
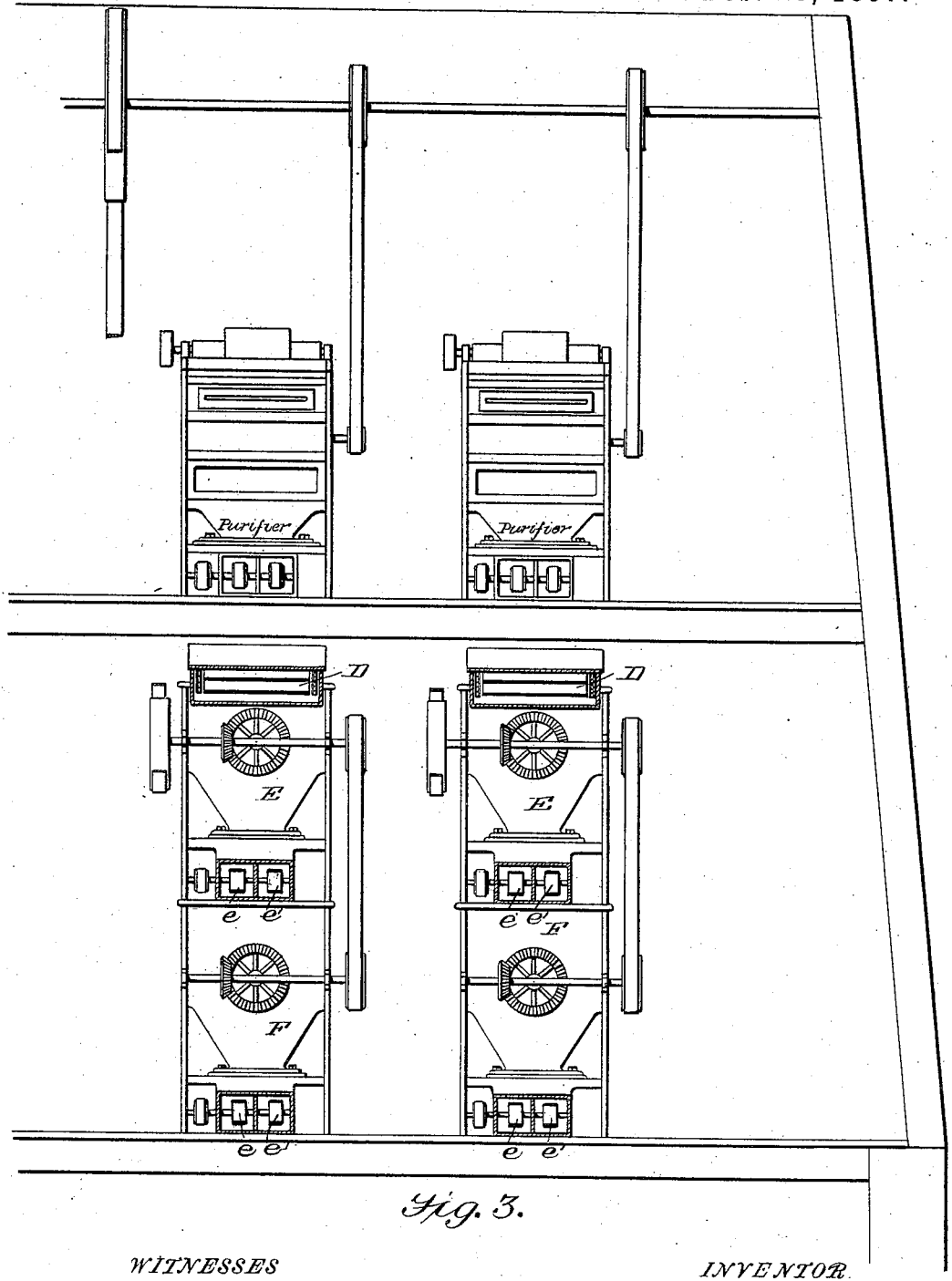

Referring to the drawings, Figure 1 is a side elevation of a mill adapted for working my invention. Fig. 2 is a front elevation of the same. Fig. 3 is a vertical section taken on the line *x x* of Fig. 1. Fig. 4 is an end view illustrating a mill for working my invention under a slightly-different arrangement of parts. Fig. 5 is an enlarged vertical section of a bolting apparatus of well-known construction which I propose to employ in my mill. Fig. 6 is a partial transverse section of the lower part of one of the flour-bolts. Fig. 7 is a view of the wheat-break, (shown also in Fig. 4,) and Fig. 8 is a longitudinal vertical section of a scalper for the wheat-breaks.

In the drawings, A represents a grain scourer or cleaner of any approved construction in which the grain is subjected to friction or rubbing, by which, as is usual in such machines, the temperature of the grain, or at least the outer portion of each berry, is raised somewhat.

B indicates a roller located immediately below the scourer and to which the grain is delivered without material loss of heat, and in which the first break is performed. A part of the energy of this roller-mill is expended in reducing the grain, while part of it is transformed into heat, so that the meal or chop leaves the rollers quite warm.

C is a scalper or grader, preferably in the form of a vibrating screen having its bolting-surface arranged in a step-like series of planes c c, (see Fig. 8,) the heated chop being delivered to the upper end of the scalper preferably by a chute or inclined board b. From this scalper C the material carried by an endless belt conveyer D is delivered, preferably, to the upper end of a pair of reels E F, in which the flour is taken out, collected upon a belt conveyer e, and is sent thence to the packer. The middlings which goes over the tail of this reel is quite coarse and is sent to a coarse-middlings purifier arranged in as close proximity to this reel as is practicable.

The material which passes through the reel E, and is too coarse for flour, is collected by another belt conveyer e', the travel of which is so timed as to be well loaded and delivered to the second reel F, the flour from which joins the flour from the upper reel E and goes to the packer, while the middlings passing through this second reel F is sent to a fine-middlings purifier so located as to avoid unnecessary delay, and therefore, as far as possible, loss of heat and evaporation.

In order to prevent reduction of temperature and evaporation of moisture or escape of other constituent elements of the grain, I so regulate the speed of travel of all the endless belts of the several conveyers that the material accumulates and lies upon their upper surface in quite a thick layer, preferably a number of inches in depth. It is obvious that such accumulation and depth of material insures a relatively small amount of surface exposed to the air in proportion to the actual amount of material which is being carried forward.

In order to reduce either of the losses above indicated to a minimum, I arrange the next reduction, machine, or break, which receives the material which has passed through the cloth of the graders E, in close proximity thereto and connect them, preferably, by a short spout, through which such material travels by gravity.

As a modification in the arrangement and operation of the two reels thus described I propose to clothe the upper reel of the pair that the flour and fine middlings will both pass through the cloth and will both be delivered to the second reel, the coarse middlings which goes over the tail of the first reel being sent to the coarse-middlings purifier. In the second reel the flour is taken out and sent to the packer, the fine middlings going over the tail of the reel and thence to the fine-middlings purifier G'.

The material which goes over the tail of the scalper C c c falls directly to the second break-rolls G without having been materially cooled and without loss by evaporation. The chop from the second break-rolls is delivered, preferably, by a chute-board or short spout to a scalper H, substantially of the same construction as scalper C, and the material which passes through the cloth of this scalper falls through conveyer D, which delivers it to the upper of another pair of reels I J, where the operation of the first pair of reels E F is repeated. The coarse middlings from these two reels I J goes to a coarse-middlings purifier, which may be the same machine to which the coarse middlings from the upper pair of rolls was sent, or to another purifier, according to the capacity of the machinery for handling the various products. The same is true of the fine middlings which comes from the two grading-reels I J.

The above-described operations are repeated throughout the remaining five breaks when that number of breaks is used, the bolting-cloths upon the scalpers and the grading-reels being of course regulated, as regards fineness of mesh, according to the requirements of each particular mill. So, also, the number of middlings-break rolls and the dress of the rolls should be determined according to the conditions in each mill wherein my process is to be carried out.

In case the amount of material to be handled during the separations makes it desirable I arrange reels which are to be used successively side by side and at short distances apart, transferring the material from one reel to the adjacent one by means of a belt conveyer traveling on a line at right angles to the axis of the reels and either horizontal or inclined, as the position of the reels may make necessary, so that the material being carried in bulk is practically protected from exposure to the atmosphere of the mill and the consequent loss hereinbefore referred to.

By careful experiments I have ascertained that in carrying out my invention in the manner above described I am able to carry the wheat through the entire series of five wheat-breaks and the intervening scalpers in one minute, whereas in ordinary mills the time required for the corresponding operations as usually carried out is about fifteen minutes. In fact, in large mills the time required is about twenty minutes under the system heretofore used. So, also, as regards carrying the middlings through their reduction-rollers I reduce the time required to a minimum and provide that the material shall be carried in bulk during the entire time when it is not actually passing through the bolting-surfaces, the depth of several inches being sufficient to prevent, practically, any loss of temperature or evaporation.

For working my invention in a small mill of, say, twenty-five barrels per diem capacity I have adopted the following construction.

Referring to Fig. 4, the chop from the first wheat-break rolls L, after being divided upon a scalper C, is delivered, the tailings to the second break-rolls M, the finer portion by a carrier D to a spout N'. The chop of the second break is divided upon the second scalper C and the finer part is delivered to the same spout. The chop from the third wheat-break O is divided upon the third scalper C. The tailings, being the bran, is sent to the proper room or bin, while that which passes through the cloth of the scalper, together with the scalped-out portion of the first and second breaks, is delivered to the grading-reel P, where the flour is taken out and the entire body of middlings is delivered by a short spout to the purifier Q, located immediately below the grading-reel. The purified middlings goes thence into the first middlings-break roll P', which is preferably placed close to the head end of the purifier to avoid all spouting at that point.

The middlings-chop goes directly onto a scalper C', the tailings of which pass to the second middlings-break R, that which goes through the cloth of the scalper passing into a middlings-reel either through a short spout or carried thence by one of the belt-carriers.

In this middlings-reel that part of the product suitable for flour is sent to the packer, the remaining portion going back to the second middlings-break, where it joins that which went over the tail of the scalper Q. The chop from the second middlings-rolls R goes to a second set of reels S S' of well-known construction, (see Fig. 5,) where the final separation is made into flour and that portion which is sometimes called "finished middlings."

T is the only elevator in the mill which is used solely for carrying up wheat from its storage-bin to, preferably, a scourer U, the rate of feed of the wheat being regulated at the point where the grain is delivered to the elevator. In a mill of this construction there need not be to exceed fifteen or twenty feet of spouting through which any one of the ground product passes, as against two to three hundred feet in a mill of like capacity in which my invention is not carried out.

In a three-break mill, which I have last above described, a part of the product which has passed through the three wheat-breaks and the two middlings-reductions, thus including the entire system, can be delivered to the packer in from three to four minutes from the time it leaves the first wheat-break rolls L and can be delivered to the packer in a warmer condition than it was when it left said first break-roll and without having suffered any material reduction in temperature or loss from evaporation during any of the manipulations to which it has been subjected. In fact, under favorable conditions and with proper management the entire mass of flour in the packer may have a temperature higher than that of the chop given to it by the first break-rolls L.

By preference I inclose the three wheat-breaks L M O and the scalpers and their conveyers or carriers in a practically tight casing V, thus preventing the inflow of air to the compartment in which these devices are located, so that if the humidity of the air of the mill be relatively low in percentage the air within that compartment will very soon become saturated and thus put a stop to any further loss by evaporation of water of constituent elements of the wheat.

The length and diameter of the reels should be so proportioned to the work required of them that the actual surface employed will be reasonably well covered, and as the flour passes through the receiving end of the bolt it is, until it passes through the cloth, constantly in contact with the warmed chop which has just left the rolls. After passing through the cloth it falls but a short distance, on an average of, say, two feet, through the air, which is warm and saturated with moisture, or of which, at least, the humidity has a high average, and after the flour reaches the conveyer or carrier it is constantly in bulk to a depth of a number of inches until it reaches a comparatively short spout, through which it is conducted to the packer, such conditions preventing any material loss of heat or by evaporation, the result being that it is practicable to pack the flour in suitable receptacles while its temperature is nearly up to the highest point it has reached at any stage of its manufacture.

It is obvious to those who are familiar with the art of milling as heretofore conducted that the entire flour-producing portion of the grain has been alternately subjected to quite extreme and frequent variations in temperature, a very large portion of such material being also subjected to the drying cooling influences of currents of air of the various relative percentages of humidity and temperature which exist in the common air of the mill where no precaution is taken to insure any uniformity as regards any of those objectionable conditions.

One invariable result of the common system of milling is that during such manufacture of the flour there is abstracted from it those constituent elements which in my process are retained in the flour, and which imparts to bread made from my flour the rich "nutty" or wheaty flavor of which the bread made from flour produced by the ordinary system of milling is almost entirely destitute.

While I have described the best or preferable mode now known to me for working my invention, I do not wish to be limited thereby, because many modifications thereof will suggest themselves to any one skilled in the art without going outside the scope or spirit of my improvement. In fact, some of the devices now in common use in mills might possibly be substituted for those which I have employed in carrying the material from one mechanism to another and yet retain some of the advantages which are incident to my new process.

What I claim as my invention is—

As an improvement in the art of milling, the process herein described of reducing the grain to the condition of a food product by a series of reductions and separations upon different machines the material being moved from one machine to another in such bulk as to practically prevent cooling during its passage from one machine to another, substantially as described.

In testimony whereof I affix my signature in presence of two witnesses.

GEORGE T. SMITH.

Witnesses:
H. H. DOUBLEDAY,
WM. H. DE LACY.